Patented Aug. 30, 1949

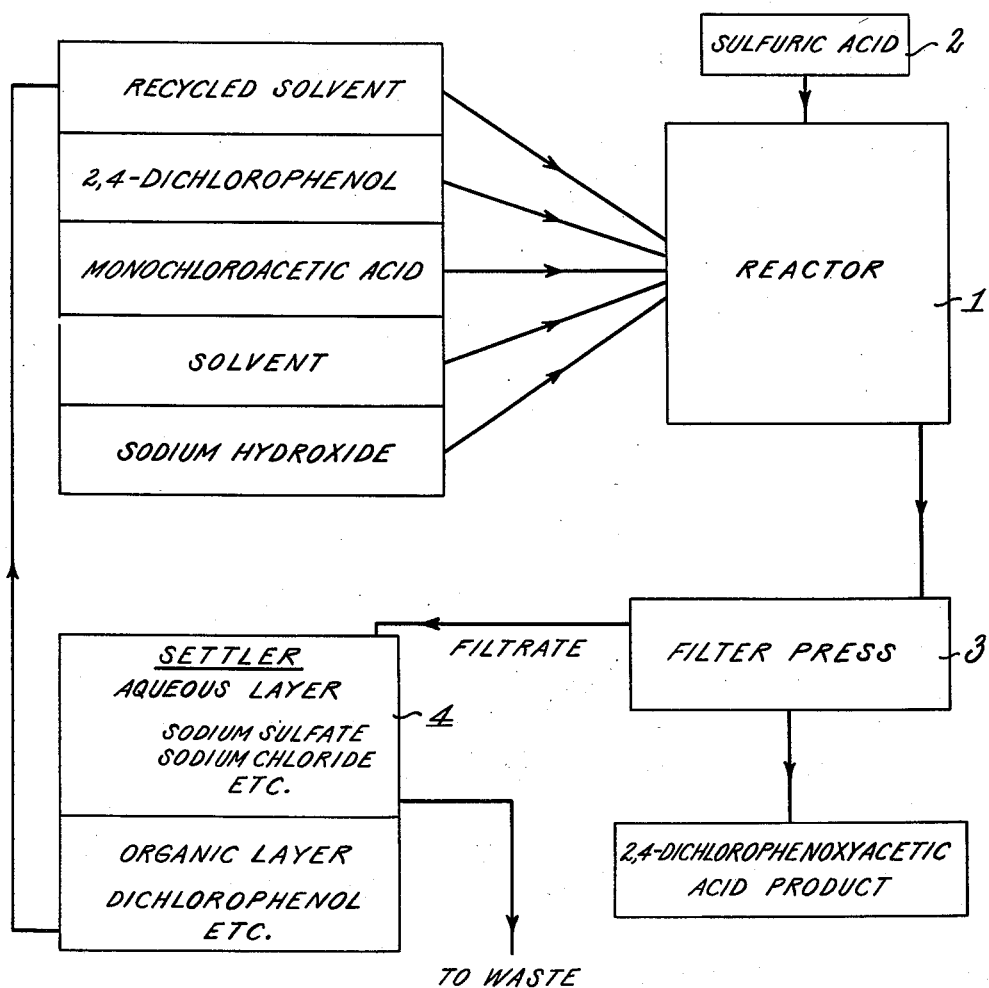

2,480,817

UNITED STATES PATENT OFFICE 2,480,817

PREPARATION OF POLYCHLOROPHENOXYACETIC ACIDS USEFUL AS PLANT GROWTH REGULATORS

John C. R. Warren, Elmira, Ontario, Canada, assignor to United States Rubber Company, New York, N. Y., a corporation of New Jersey Application August 5, 1947, Serial No. 766,209
In Canada June 17, 1947

11 Claims. (Cl. 260—521)

This invention relates to the preparation of polychlorophenoxyacetic acids useful as plant growth regulators and particularly to the preparation of 2,4-dichlorophenoxyacetic acid which is becoming of increasing importance as a plant hormone and weed killer.

The principal object of the present invention is to provide an improved method of preparing aryloxyaliphatic acids, particularly 2,4-dichlorophenoxyacetic acid. Another object is to provide a method whereby such compounds are obtained in greater yields and are of a superior quality. Another object is to provide a method whereby any reactants which have not reacted nor decomposed are retained in a form suitable for immediate re-use without an intermediate purification or separation. Another object is to eliminate complicated and expensive purification of the product 2,4-dichlorophenoxyacetic acid.

2,4-dichlorophenoxyacetic acid was first reported by Pokorny in 1941 (J. A. C. S., 63, 1768), who evaporated an aqueous solution of 2,4-dichlorophenol, monochloroacetic acid and sodium hydroxide to dryness. Previously Koelsch, in 1931 (J. A. C. S., 53, 304), recommended the preparation of aryloxyacetic acids as an identification method for phenols, by reacting the phenol with monochloroacetic acid in aqueous sodium hydroxide. Hardman, in 1946 (U. S. Patent 2,410,782), prepared substituted aryloxyacetic acids by reacting the substituted phenols with monochloroacetic acid in an aqueous solution of sodium hydroxide. In the conventional method of making 2,4-dichlorophenoxyacetic acid, a considerable amount of water is employed to keep the reaction mixture fluid throughout the course of the reaction. The alkali metal salt, of the aryloxyaliphatic acid which is formed, is converted to the free acid by the addition of a dilute aqueous mineral acid.

In producing 2,4-dichlorophenoxyacetic acid by conventional methods such as have just been described, the product obtained smells very strongly of dichlorophenol and melts at 133–138° C. The yield based on monochloroacetic acid is 70 to 80 per cent. To obtain a suitable product the quality must be improved by recrystallization from a solvent, by removing organic impurities through a vacuum or steam distillation or by reprecipitation from one of its salts. These purification procedures add to the expense of manufacture and moreover entail a loss of the 2,4-dichlorophenoxyacetic acid, thereby further reducing the over-all yield of the product.

The reaction involved may be expressed as follows:

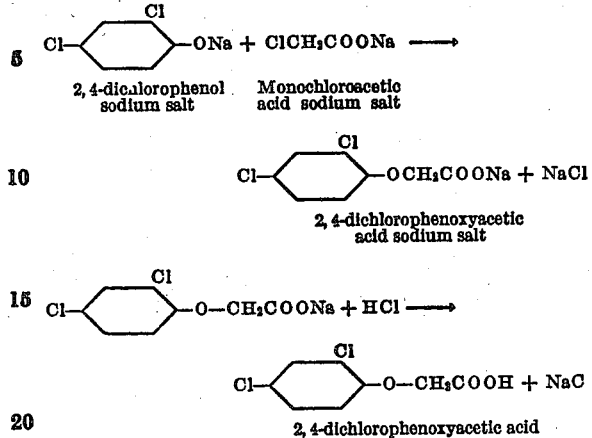

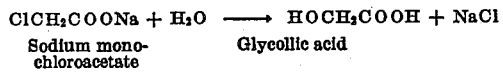

In this reaction, dichlorophenol does not appear to react to produce by-products to any appreciable extent. However, under alkaline conditions, the sodium monochloroacetate hydrolyzes according to the following equation to form a glycollic acid:

$ClCH_2COONa + H_2O \longrightarrow HOCH_2COOH + NaCl$
Sodium mono-         Glycollic acid
chloroacetate This water-soluble glycollic acid remains dissolved in the reaction mother liquor with which it is discarded. Formation of this glycollic acid represents a substantial loss of valuable chloroacetic acid and correspondingly reduces the yield of 2,4-dichlorophenoxyacetic acid based on chloroacetic acid charged.

Following the neutralization of the reaction mixture obtained from the conventional preparation, a portion of the unreacted dichlorophenol separates as such while the balance of it remains associated with the product 2,4-dichlorophenoxyacetic acid, contaminating the same. The present invention provides a simple, efficient and economical process whereby 2,4-dichlorophenoxyacetic acid of high quality is produced in an improved yield.

I have discovered a simplified and efficient process whereby the initial reaction product is obtained in improved yield and of satisfactory quality without going to the extra expense and difficulty of further purification such as by recrystallization, steam distillation, vacuum distillation, or reprecipitation. My improved process involves reacting the alkali metal salt of the aromatic nuclear - substituted - hydroxy compound, such as the sodium salt of dichlorophenol, and the alkali metal salt of the alpha-halogenated aliphatic carboxylic acid, such as sodium chloroacetate, in a reaction medium comprising water and a substantially water-insoluble organic liquid which is a solvent for the aromatic nuclear-substituted-hydroxy compound. The process of my invention is highly advantageous because any unreacted dichlorophenol, which of course is liberated upon the acidification of the reaction mixture, is retained in solution in the water-insoluble organic liquid and may be used in a subsequent reaction without recovery from the solvent.

In a typical procedure involving the present invention, a mixture of an alkali metal salt of 2,4-dichlorophenol, an alkali metal salt of chloroacetic acid, water and a substantially water-insoluble organic liquid which is a solvent for 2,4-dichlorophenol is caused to undergo reaction by refluxing until the reaction is substantially complete. The reaction mixture is then acidified with a suitable acid, preferably dilute aqueous sulfuric acid, and the resulting mixture is then cooled to room temperature. When the reaction mixture is acidified at an elevated temperature, say at from 70 to 90° C., it forms two layers, all of the 2,4-dichlorophenoxyacetic acid being dissolved in the two phases. On cooling, an emulsion is formed and from this emulsion 2,4-dichlorophenoxyacetic acid precipitates beginning at 50-60° C. This 2,4-dichlorophenoxyacetic acid appears to be retained in the organic phase of the emulsion and consists of fairly uniform fine particles while the balance of the 2,4-dichlorophenoxyacetic acid, some 10 to 20 per cent thereof, still is dissolved in the organic liquid. The organic layer contains from 2 to 15 per cent 2,4-dichlorophenoxyacetic acid, depending upon the amount of dichlorophenol and other impurities dissolved in it. The amount of dichlorophenol in the organic liquid varies from 10 to 20 per cent and is usually from 12 to 15 per cent. The cooled reaction mixture is filtered to separate the precipitated 2,4-dichlorophenoxyacetic acid. The filtrate is allowed to separate into layers under the influence of gravity. The organic layer, containing principally the organic liquid, having dissolved therein the dichlorophenol and some 2,4-dichlorophenoxyacetic acid separates readily from the aqueous layer and is removed and re-used in the next preparation. If necessary, additional solvent to make up system losses may be added during the preparation of the next reaction mixture. This organic phase can be re-used from 20 to 60 times on a plant scale before impurities accumulate therein to such an extent that it is necessary to distill it. If desired, suitable provision may be made for re-running a small portion of the recycled organic phase in order to keep the impurities in the system at a suitable low level.

The purification of the recycled solvent may be accomplished in any desired manner, for example by first distilling off the solvent and then the dichlorophenol, the latter often being removed either by vacuum distillation or steam distillation. The organic phase can be recycled many times without purification. The number of times which it can be recycled depends upon the purity of the raw materials, especially the halogenated acid, and upon the extent and nature of by-products formed in the reaction.

The acidification of the reaction mixture is preferably conducted at a temperature which is sufficiently high that the reaction mixture is entirely liquid, after acidification, i. e. so that no solidification of any components thereof takes place. The temperature at which the reaction mixture is acidified may conveniently range from 70 to 90° C. The acidified mixture is preferably cooled to a temperature below 60° C., and still more preferably to below 40° C., say down to room temperature or even lower, to effect precipitation of the 2,4-dichlorophenoxyacetic acid product. It is preferred to cool below 40° C. so that the balance of the recycle solvent system does not have to be heated to avoid further precipitation. The lower the temperature to which the mixture is cooled, the more completely is the 2,4-dichlorophenoxyacetic acid thrown out of solution. However the cooling should not be carried to so low a temperature that solidification of other materials present, especially water, takes place.

Preferably the reaction mixture is vigorously agitated during the reaction and during the acidification. In some cases the mixture may be sufficiently agitated during the reaction as a result of the boiling action.

The reaction temperature conveniently is the boiling point of the mixture which may range from 70 to 120° C. depending upon the composition of the reaction mixture and the pressure which is usually atmospheric. It is preferred to use as high a temperature as is feasible in order to promote rapid reaction, and in some cases as where the solvent is relatively low-boiling the reaction may be conducted under pressure in order to secure higher reaction temperatures.

Other advantages of the incorporation of a water-insoluble organic solvent with the reactants at the beginning of the reaction in accordance with the present invention are that the powder form of the 2,4-dichlorophenoxyacetic acid produced is more desirable than is the case when the solvent is omitted, the amount of water employed in the reaction mixture may be substantially reduced which correspondingly decreases the amount of hydrolysis of sodium monochloroacetate to glycollic acid and thereby gives a noticeable increase in yield of 2,4-dichlorophenoxyacetic acid based on the monochloroacetic acid charged, and that it makes practical the use of excess dichlorophenol in the reaction to further improve the yield. My invention takes advantage of the discovery that the product 2,4-dichlorophenoxyacetic acid is far less soluble in the solvent than is the dichlorophenol whereby the dichlorophenol is prevented from contaminating the product 2,4-dichlorophenoxyacetic acid. The 2,4-dichlorophenoxyacetic acid is fairly soluble in the organic liquid and a certain amount of it inevitably is recycled with the solvent from batch to batch; however in spite of this the yields of 2,4-dichlorophenoxyacetic acid obtained in accordance with the present invention are considerably better than the yields obtained by the standard methods of preparation of the prior art.

The organic liquid which is employed in the practice of the present invention should have the following characteristics. It should be substantially water-insoluble so that it forms a separate liquid phase under the conditions of reaction, acidification and cooling and so that losses due to solubility of the solvent in water are reduced. It should be inert under the conditions of reaction. It should be a good solvent for the aromatic nuclear-substituted-hydroxy compound such as 2,4-dichlorophenol so that when the reaction mixture is acidified the liberated phenol will go preferentially into the organic liquid phase. It should exhibit a considerably lower solubility for the product than for the phenol. Examples of suitable solvents are hydrocarbons such as paraffins, olefins, cycloparaffins, monocyclic aromatic hydrocarbons such as benzene, toluene and xylene, and halogenated hydrocarbons such as halogenated paraffins and olefins, for example carbon tetrachloride, perchlorethylene, ethylene dichloride, etc., halogenated cycloparaffins such as chlorocyclohexane, halogenated monocyclic aromatic hydrocarbons such as monochlorobenzene, ortho-dichlorobenzene, etc. I prefer to use monochlorobenzene when synthesizing 2,4-dichlorophenoxyacetic acid from dichlorophenol and chloroacetic acid.

The organic solvent which is used should be liquid at temperatures ranging from the temperature at which the cooling step is conducted up to the temperature at which the reaction is conducted. Its boiling point should be sufficiently high that the desired reaction takes place at a suitably rapid rate. Usually organic liquids having a boiling point of from 70 to 200° C. are employed.

The ratio of water to the organic liquid may be varied within wide limits. Usually the ratio will range from 1:10 to about 1:1.5 by weight. The amounts of solvent and of water relative to the amounts of the reactants may likewise vary considerably but preferably are sufficient to keep the reaction mixture fluid throughout the course of the reaction. The amount of water may conveniently range from 10 to 100 per cent by weight of the reactants and the amount of solvent is generally substantially greater and may range from 100 to 200 per cent by weight of the reactants.

In some cases the water present in the reaction mixture may be only that water formed by neutralization of the phenolic compound and the halogenated aliphatic acid with the alkali metal hydroxide.

The alkali metal hydroxide may be introduced either in the form of an aqueous solution or as anhydrous solid.

Preferably the alkali metal hydroxide is added last since otherwise lower yields are obtained. Furthermore it is preferable to have the reaction mixture rise from atmospheric temperature to reaction temperature, i. e. refluxing conditions, as rapidly as possible. This is insured by adding the alkali metal hydroxide last, since the neutralization of the reactants is highly exothermic.

The proportions of the aromatic nuclear-substituted-hydroxy compound and of the alpha-halogenated aliphatic carboxylic acid employed may vary widely but it is preferred to employ a substantial molar excess of the former. For example in the preparation of 2,4-dichlorophenoxyacetic acid in accordance with the present invention, I find it convenient to employ from 1.2 to 1.6 mols of 2,4-dichlorophenol per mol of chloroacetic acid. As explained above, the use of excess dichlorophenol which is made practical by the present invention results in a substantial improvement in the yield of the desired product.

While the invention is preferably applied to the production of 2,4-dichlorophenoxyacetic acid from 2,4-dichlorophenol and chloroacetic acid, it may be employed to produce other aryloxyaliphatic acids. For example any aromatic nuclear-substituted-hydroxy compound such as phenols, cresols, xylenols, naphthols and the like, and their halogeno, alkoxy, aryloxy, amino, arylamino, nitro, carboxy, etc. derivatives may be used in the practice of the present invention. Examples of such other phenolic compounds are beta-naphthol and p'-amino p-hydroxydiphenyl. Likewise in place of monochloroacetic acid, other alpha-halogenated aliphatic acids may be used, e. g. dichloroacetic acid, alpha-chloropropionic acid, alpha-chlorobutyric acid, etc.

While the sodium salts of the reactants such as 2,4-dichlorophenol and monochloroacetic acid are preferred on account of cheapness and availability, other alkali metal salts such as those of potassium or lithium may be employed.

The amount of alkali metal hydroxide employed may vary widely but preferably ranges from 100 to 110 per cent of that theoretically required to neutralize all of the phenolic compound and the halogenated aliphatic acid. Within this range, I prefer to use as nearly to 100% of the theoretical amount of alkali metal hydroxide as possible.

The accompanying drawing portrays diagrammatically the preparation of 2,4-dichlorophenoxyacetic acid in accordance with the present invention. As is illustrated in the drawing, the several ingredients making up the reaction mixture, namely 2,4-dichlorophenol, monochloroacetic acid, sodium hydroxide, and water and the organic liquid are charged to the reactor 1 together with recycled solvent which contains the unreacted dichlorophenol and some 2,4-dichlorophenoxyacetic acid. The sodium hydroxide is added last. After reaction is completed, sulfuric acid may be added to the reaction mixture from a supply indicated by block 2. The resulting mixture, after cooling, may be passed to filter press 3 where the 2,4-dichlorophenoxyacetic acid product is separated in the usual manner. The filtrate is passed to settling zone 4 where where it is allowed to settle into two layers, an aqueous layer which is withdrawn and discarded and an organic layer which is recycled to the reactor 1.

Instead of filtration, any other mode of separating the precipitated product from the cooled reaction liquor such as solid-liquid centrifuging, etc. may be employed. Furthermore instead of gravity separation for effecting settling of the residual liquid as indicated in block 4, I may use any other means for effecting this separation into phases, such as liquid-liquid centrifuging.

While the process of my invention has been described herein as being conducted in a batchwise manner, it will be understood by those skilled in the art that it may with suitable modification be carried out continuously.

Following are illustrative examples of the practice of my invention:

Example 1

117 grams sodium chloroacetate, 284 grams sodium dichlorophenolate, 500 grams monochlorobenzene and 330 grams water were refluxed in an agitated vessel for three hours. After acidification with 450 grams of 15 per cent sulfuric acid (aqueous), the reaction mixture was filtered and washed at 15–20° C. After oven-drying, the product, 2,4-dichlorophenoxyacetic acid, weighed 190 grams and melted at 138–139°.

Example 2

95 grams monochloroacetic acid, 250 grams dichlorophenol, 500 grams monochlorobenzene, 200 grams water and 170 grams 50% sodium hydroxide were refluxed in an agitated vessel for three hours. After acidification with 450 grams of 15 per cent sulfuric acid, the reaction mixture was filtered and washed at 15-20° C. After oven-drying, the product, 2,4-dichlorophenoxyacetic acid, weighed 193 grams and melted at 140-141°.

*Example 3*

The organic filtrate from a preceding preparation (which contains 50-75 grams of 2,4-dichlorophenol in 500-600 grams of solution) is mixed with 155 grams 2,4-dichlorophenol, 50 grams monochlorobenzene, 95 grams monochloroacetic acid, and 100 grams water. About 200 grams 50% sodium hydroxide solution are added and the mixture refluxed as quickly as possible in an agitated vessel for three hours. The mixture is acidified at 80° with 15% aqueous sulfuric acid, and then cooled to room temperature. The reaction mixture is filtered and the filter cake washed with cold water. All the filtrate is allowed to settle and the organic layer (containing principally dichlorophenol, monochlorobenzene and some 2,4-dichlorophenoxyacetic acid) which separates readily from the aqueous layer is removed and stored for use in the next preparation. The filter cake is dried at 80-100° and weighs 187 grams. The product melts at 139-140° C.

*Example 4*

This example illustrates the use of anhydrous alkali metal hydroxide, the only water present in the reaction mixture being that formed as a result of neutralization of the dichlorophenol and the chloroacetic acid.

One thousand grams of the organic filtrate from a preceding preparation (and containing 2,4-dichlorophenol and monochlorobenzene, the 2,4-dichlorophenol being present in the proportion of 50-75 grams per 500-600 grams of solution) were admixed with 170 grams of fresh 2,4-dichlorophenol and 95 grams of chloroacetic acid. The resulting mixture was warmed to 30-40° C. whereupon 105 grams of anhydrous flake sodium hydroxide were added. The mixture was warmed before the addition of the flake caustic so that the addition thereof would carry the mixture up to the refluxing temperature. In this way higher yields are obtained than would be obtained if the resulting mixture had to be heated to the refluxing temperature by extraneous means. The resulting mixture was then treated in exactly the same manner as is described in Example 3. The dried product weighed 195 grams and had a melting point of 139-140° C.

*Example 5*

This example illustrates the preparation of beta-naphthoxyacetic acid from beta-naphthol and chloroacetic acid in accordance with the present invention.

Seven hundred grams of organic filtrate from a previous run (and containing beta-naphthol and monochlorobenzene in the proportion of about 50-75 grams of beta-naphthol per 500-600 grams of solution) was mixed with 140 grams of fresh beta-naphthol and 95 grams of chloroacetic acid. The resulting mixture was warmed to 30-40° C. whereupon about 200 grams of aqueous 50 per cent sodium hydroxide solution were added. The mixture was refluxed and thereafter processed in identically the same way as described in Example 3. The filter cake was dried and weighed 170 grams and had a melting range of 153-155° C. indicating that it was fairly pure beta-naphthoxyacetic acid. The organic layer containing principally beta-naphthol, monochlorobenzene and some beta-naphthoxyacetic acid was used in the next run.

From the foregoing description, numerous advantages of my invention will be apparent to those skilled in the art. The method of preparation of my invention gives substantially better yields of the desired product than is the case with prior methods. The yield of 2,4-dichlorophenoxyacetic acid in accordance with the present invention is better than 80 per cent based on chloroacetic acid charged and very frequently it is better than 85 per cent. The product is of better quality being much freer from dichlorophenol. The method of preparation of my invention eliminates the necessity of additional purification steps with their attendant expense and loss of product. The invention permits an excess of dichlorophenol to be used and this may be recycled to complete consumption. The organic solvent may be recycled many times so that the solvent costs are low. The invention enables the use of less water in the reaction mixture which substantially reduces the loss of chloroacetic acid by hydrolysis to glycollic acid. The 2,4-dichlorophenoxyacetic acid obtained in powdered form by the practice of the invention is more desirable than the powdered 2,4-dichlorophenoxyacetic acid obtained when the organic solvent is not employed; the product is superior both physically and chemically, a particularly noticeable point of superiority being its improved color which is attributable to the retention of colored impurities in the recycled solvent.

The reaction medium used in accordance with my invention usually and almost invariably consists of water and the substantially water-insoluble organic liquid only.

As used herein the expression "chloroacetic acid" is employed in its usual sense to designate monochloroacetic acid.

Having thus described my invention, what I claim and desire to protect by Letters Patent is:

1. The process of preparing a polychlorophenoxyacetic acid useful as a plant growth regulator which comprises reacting an alkali metal salt of a polychlorophenol and an alkali metal salt of chloroacetic acid in a reaction medium comprising water and a substantially water-insoluble inert organic liquid which is a solvent for said polychlorophenol and which is selected from the group consisting of hydrocarbons and halogenated hydrocarbons.

2. The process of preparing 2,4-dichlorophenoxyacetic acid which comprises reacting an alkali metal salt of 2,4-dichlorophenol and an alkali metal salt of chloroacetic acid in a reaction medium comprising water and a substantially water-insoluble inert organic liquid which is a solvent for 2,4-dichlorophenol and which is selected from the group consisting of hydrocarbons and halogenated hydrocarbons, acidifying the resulting reaction mixture, and separating precipitated 2,4-dichlorophenoxyacetic acid from the acidified reaction mixture.

3. The process of preparing a polychlorophenoxyacetic acid useful as a plant growth regulator which comprises reacting an alkali metal salt of a polychlorophenol and an alkali metal salt of chloroacetic acid in a reaction medium comprising water and a substantially water-insoluble inert organic liquid which is a solvent for said polychlorophenol and which is selected from the group consisting of hydrocarbons and halogenated hydrocarbons, in a reaction zone, acidifying the resulting reaction mixture, separating precipitated polychlorophenoxyacetic acid from the acidified reaction mixture, separating the residual mixture into an organic phase containing the polychlorophenol and the organic liquid and an aqueous phase, and recycling said organic phase to the reaction zone as a source of said polychlorophenol and of said organic liquid.

4. The process of preparing 2,4-dichlorophenoxyacetic acid which comprises reacting an alkali metal salt of 2,4-dichlorophenol and an alkali metal salt of chloroacetic acid in a reaction medium comprising water and a substantially water-insoluble inert organic liquid which is a solvent for 2,4-dichlorophenol and which is selected from the group consisting of hydrocarbons and halogenated hydrocarbons, acidifying the resulting reaction mixture, separating precipitated 2,4-dichlorophenoxyacetic acid from the acidified reaction mixture, separating the residual mixture into an organic phase containing 2,4-dichlorophenol and the organic liquid and an aqueous phase, and recycling said organic phase to the reaction zone as a source of said 2,4-dichlorophenol and of said organic liquid.

5. The process of preparing 2,4-dichlorophenoxyacetic acid which comprises refluxing a mixture of an alkali metal salt of 2,4-dichlorophenol, an alkali metal salt of chloroacetic acid, water and a substantially water-insoluble inert organic liquid which is a solvent for 2,4-dichlorophenol and which is selected from the group consisting of hydrocarbons and halogenated hydrocarbons in a reaction zone, acidifying the resulting reaction mixture at a temperature of from 70 to 90° C., cooling the acidified reaction mixture to a temperature below 60° C. and thereby effecting precipitation of the 2,4-dichlorophenoxyacetic acid, separating the precipitated 2,4-dichlorophenoxyacetic acid from the resulting mixture, separating the residual mixture into an organic phase containing 2,4-dichlorophenol and the organic liquid and an auqeous phase, and recycling said organic phase to the reaction zone as a source of said 2,4-dichlorophenol and of said organic liquid.

6. The process of preparing 2,4-dichlorophenoxyacetic acid which comprises refluxing a mixture comprising 2,4-dichlorophenol, monochlorobenzene, chloroacetic acid, sodium hydroxide and water, said mixture comprising a recycle organic layer hereinafter identified, the 2,4-dichlorophenol being present in substantial molar excess with respect to said chloroacetic acid, the weight ratio of water to monochlorobenzene ranging from 1:10 to 1:1.5, continuing said refluxing until the reaction is substantially complete, acidifying the resulting reaction mixture at a temperature of from 70 to 90° C. with sulfuric acid, cooling the acidified mixture to a temperature below 40° C. and thereby effecting precipitation of the 2,4-dichlorophenoxyacetic acid, separating the precipitate from the cooled reaction mixture, separating the residual liquid into an organic phase containing 2,4-dichlorophenol and monochlorobenzene and an aqueous phase, and recycling said organic phase to said refluxing step as a source of said 2,4-dichlorophenol and of said monochlorobenzene.

7. The process of preparing a polychlorophenoxyacetic acid useful as a plant growth regulator which comprises forming a reaction mixture comprising a polychlorophenol, chloroacetic acid, an anhydrous alkali metal hydroxide and a substantially water-insoluble inert organic liquid which is a solvent for said polychlorophenol and which is selected from the group consisting of hydrocarbons and halogenated hydrocarbons, substantially the only water present in said mixture being that formed by neutralization of said polychlorophenol and said acid with said alkali metal hydroxide, heating said mixture at a temperature and for a period of time sufficient to bring about reaction between the alkali metal salt of said polychlorophenol and the alkali metal salt of said acid, acidifying the resulting reaction mixture, and separating the precipitated polychlorophenoxyacetic acid from the acidified reaction mixture.

8. The process of preparing 2,4-dichlorophenoxyacetic acid which comprises reacting an alkali metal salt of 2,4-dichlorophenol and an alkali metal salt of chloroacetic acid in a reaction medium comprising water and monochlorobenzene.

9. The process of claim 8 wherein said reaction mixture contains from 1.2 to 1.6 mols of 2,4-dichlorophenol per mol of chloroacetic acid.

10. The process of claim 8 wherein the amount of water present in the reaction mixture ranges from 10 to 100 per cent by weight of the 2,4-dichlorophenol and the chloroacetic acid and wherein the amount of said monochlorobenzene ranges from 100 to 200 per cent by weight of the 2,4-dichlorophenol and the chloroacetic acid.

11. The process of preparing 2,4-dichlorophenoxyacetic acid which comprises preparing a reaction mixture comprising 2,4-dichlorophenol, chloroacetic acid, an alkali metal hydroxide and monochlorobenzene, substantially the only water present in said mixture being that formed by neutralization of said 2,4-dichlorophenol and said chloroacetic acid with said alkali metal hydroxide, and heating said mixture at a temperature and for a period of time sufficient to bring about reaction between the alkali metal salt of said 2,4-dichlorophenol and the alkali metal salt of said chloroacetic acid.

JOHN C. R. WARREN.

REFERENCES CITED

The following references are of record in the file of this patent:

Fritzsche, Jour. fur Prat. Chem., bd. 128, N. F. 20, pp. 269–274 (1879).

Koelsch, Jour. Amer. Chem. Soc., vol. 53, page 304 (1931).

Pokorny, Jour. Amer. Chem. Soc., vol. 63, page 1768 (1941).

Lange, "Handbook of Chemistry," 5th ed., Handbook Publ. Co. Inc. (1944), pp. 424–425.

Haskelberg, Jour. Organic Chemistry, vol. 12, page 427 (1947).